Feb. 5, 1935.  J. W. M. DU MOND ET AL  1,990,022
X-RAY DOSIMETER
Filed April 21, 1931  2 Sheets-Sheet 1
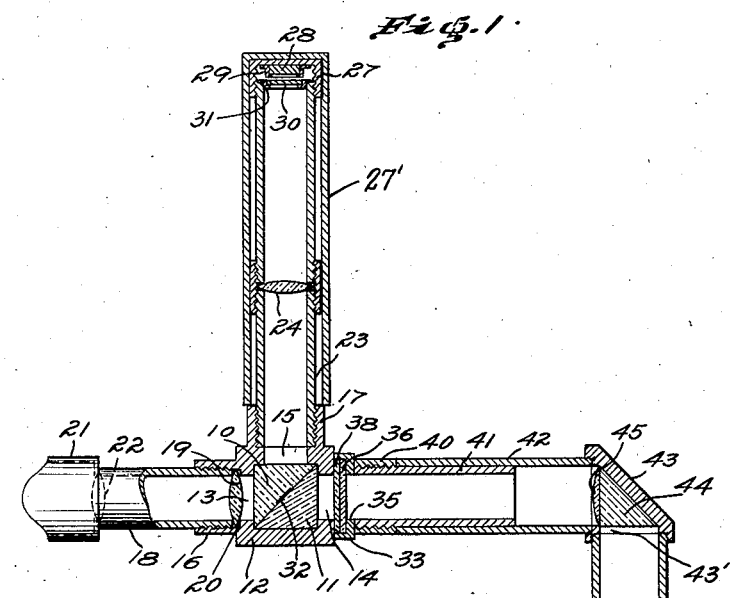
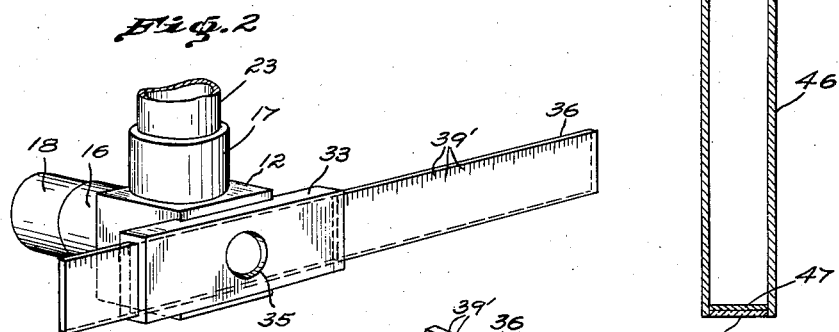
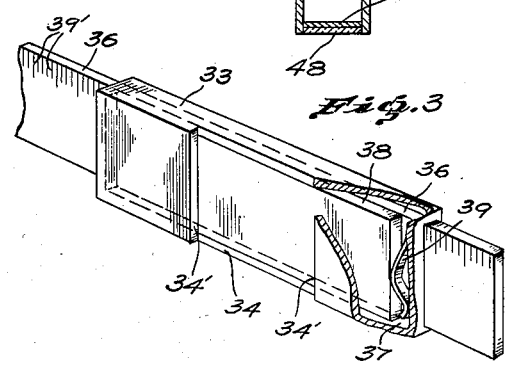
Inventors
Jesse W. M. Du Mond
Archer Hoyt
by John F. Cam
Attorney

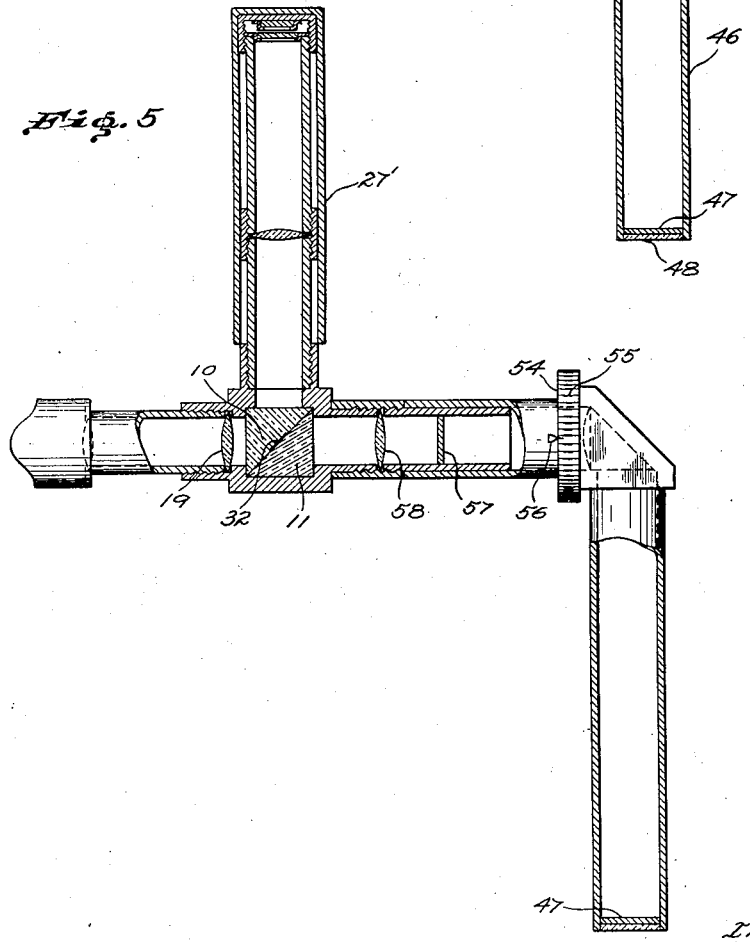

Patented Feb. 5, 1935

1,990,022

UNITED STATES PATENT OFFICE 1,990,022

X-RAY DOSIMETER

Jesse W. M. Du Mond and Archer Hoyt, Pasadena, Calif.

Application April 21, 1931, Serial No. 531,720

7 Claims. (Cl. 250—34)

This invention relates to a mechanism and process for measuring the intensity of X-rays emanating from any suitable source by a photometric method; that is, comparing the fluorescent light intensity excited by X-rays from any source with the intensity of a predetermined standard of illumination.

In the therapeutic treatment of the body by subjecting certain portions thereof to beneficial rays such as X-rays or ultra violet rays, it is highly desirable for the good of the patient, to know the strength of the rays applied to the portions to be treated. So far as we know, there are no wholly satisfactory methods or apparatus at the present time for determining the strength of X-rays or ultra violet rays emanating from a source.

In order to provide a suitable basis of comparison, the X-rays to be measured, which of course are invisible, are caused to produce luminescence, as by the aid of a fluorescent screen. The degree of luminescence thus produced is directly dependent upon the X-ray intensity, and a measure of this degree, as by comparison with a standard of illumination will permit a measurement of X-ray intensity. The constant or standard luminosity may come from a primary light source or from another fluorescent screen of the same material as the screen stimulated by the X-rays, and excited by the radiation from a constant radioactive body. This source of standard illumination thus has the advantage that it produces the same color of light as those produced as a result of X-ray stimulation, and therefore the comparison of their intensities is much more accurate than it otherwise would be. Preferably, the two illuminations thus obtained are then so controlled that their intensities are equal. The required quantity of control to effect this is a measure of the X-ray intensity either directly or evaluated by the aid of calibration curves or tables.

It is therefore an object of our invention to provide a device of the character generally described hereinabove for measuring the strength of X-rays emanating from any source.

It is a further object of this invention to provide a device which can be readily adjusted or positioned to receive the X-rays emanating from any source and direct their fluorescent effects on a suitable focal plane.

It is a further object of this invention to provide a device simple in design and construction, and relatively inexpensive to manufacture.

One way in which the comparison of illumination thus obtained is effected, includes a stationary compensating optical wedge and a juxtaposed relatively movable measuring optical wedge, interposed in the path of the fluorescent light excited by the X-rays of unknown strength. By simply moving the measuring wedge in a direction coincident with its length, the brilliancy of the fluorescent light excited by the unknown strength of X-rays is decreased until it is of the same brilliancy as the rays from a standard source.

The optical wedges utilized in our invention are well-known in the art. They each comprise in general a transparent and opaque end with intermediate continuous and uniform gradations in density or opacity between the transparent end and the opaque end. These wedges are arranged in our apparatus with the graduated density of one wedge grading in an opposite direction to the graduated density of the other. In this manner the degree of translucency in any one position of the juxtaposed wedges is always uniform over the entire field for any particular setting of the wedges. The optical wedge may also have its gradation of density disposed about the circumference of a circular disc to save space and for greater convenience.

It is therefore another object of our invention to provide a convenient and compactly arranged controlling optical wedge system for this purpose.

Other means can be used if desired in place of optical wedges for adjusting or controlling the intensity of the fluorescent light excited by X-rays.

Our invention possesses many other advantages, and has other objects which may be made more easily apparent from a consideration of several embodiments of our invention. For this purpose we have shown a few forms in the drawings accompanying and forming part of the present specification. We shall now proceed to describe these forms in detail, which illustrate the general principles of our invention; but it is to be understood that this detailed description is not to be taken in a limiting sense, since the scope of our invention is best defined by the appended claims.

Referring to the drawings:

Figure 1 is a vertical sectional view through an X-ray dosimeter embodying our invention;

Fig. 2 is a fragmentary elevation of the device shown in Fig. 1, showing the arrangement and mode of operation of the optical measuring wedge in a slide;

Fig. 3 is an elevational view with part in section of the slide, showing the arrangement of the short compensating optical wedge therein;

Fig. 4 is a view similar to Fig. 1, of a modified form of the dosimeter; and

Fig. 5 is a similar view of a still further modification.

The X-ray dosimeter of the form shown in Fig. 1, comprises a common focal plane, where the images of two sources of illumination are produced. One source of illumination is a fluorescent screen 47 excited by the X-rays to be measured, and the other source is a standard with which the said illumination of screen 47 is to be compared. In this instance, the standard illumination is produced by exciting a fluorescent screen 30 by a constant source of exciting rays, as from the material 28 of radioactive properties.

The comparison of the two light intensities is made by the aid of a pair of prisms 10 and 11 of triangular cross-section, cemented together with their correspondingly longest faces in opposed abutting relationship. These prisms are maintained in this position by means of a closely encasing housing 12 formed about the periphery thereof in any desirable manner.

The housing 12 is so formed about the prisms, that rays from sources of illumination can be transmitted through the prisms along any one or all of several directions. This can be readily accomplished by providing openings 13, 14, and 15 in two of the sides and the top or bottom of the housing 12. As shown in Fig. 1, the opening 15 is formed in the top. Internally threaded collars 16 and 17 can be formed integral with the housing 12 and extend outwardly from one side and top thereof adjacent the openings 13 and 15 respectively.

As described hereinafter, the two openings 14, 15 serve respectively to pass light from screens 47, 30 to prisms 10, 11, where their relative intensities are compared by viewing the prisms through opening 13.

For this purpose an eyepiece lens or sighting lens 19 is inserted in a collar 16, and firmly held adjacent the opening 13 by one end of a tubular metallic sighting sleeve 18, and a shoulder 20. This sleeve can be screw-threaded into the collar 16 until the end thereof contacts with the outer edge of the lens 19 and brings it against the shoulder 20, thus pinching the lens between the end of the sleeve and the shoulder. The shoulder 20 is formed integral with the housing 12. An eyepiece cup 21 can be fastened to the sleeve 18 at its other end so that an observer can readily view the prisms 10 and 11 through the lens 19. This cup is important because it excludes all extraneous light which may interfere with the act of comparing the light intensities. An additional sighting lens 22 can be provided, and can be positioned in the sleeve 18 to provide the desired optical eyepiece. A slight improvement not shown in the drawings is to mount the eyepiece lenses in an auxiliary sliding tube which can then be adjusted in position to accommodate the eyes of the particular observer.

The illumination from screen 30 is reflected in a manner to be hereinafter described, at the common face of the prisms 10 and 11, and the illumination from screen 47 is passed through both prisms 10, 11 and into the eyepiece tube 18.

Thus a tube 23 is fastened into collar 17. This tube carries the screen 30 by the aid of a frame 31; and it also carries the material 28 which excites the fluorescent screen 30. This material is a radio-active salt or the like, and is held in a casing 29 fastened to cap 27. A lead sheath 27' can be used to prevent X-rays from the source under investigation, from affecting the screen 30. Cap 27 is attached to the top of tube 23, which also carries a lens 24 to focus the image of the screen 30 onto a silvered spot 32. This silvered spot is a chemically deposited reflecting film on the face of the prism 10, and its plane is such that it reflects the image axially of tube 18 toward the eyepiece structure.

The mirrored surface 32 consists of a small elliptical reflecting spot between the two prisms 10 and 11, the reflecting surface being directed toward eyepiece cup 21. Thus an observer sighting through the eyepiece 21 and lenses 22 and 19, will view the reflection of the image of the screen 30 illuminated by the action of radium rays of standard intensity emanating from the material 28 and directed against the mirror by the lens 24. Due to the mirror angle, the elliptic mirror is seen as a circle by the eye.

The illumination caused by the action of the X-rays on screen 47 is compared with the illumination of mirror 32. To accomplish this result, the illumination of screen 47 is cut down until it is the same as that of mirror 32, and the quantity of control necessary to obtain this balance can be used, in conjunction with calibration curves, to determine the intensity of the X-ray source.

Thus a slide 33 having a cut-out portion 34 in the back thereof (Fig. 3) is secured to the housing 12 adjacent the opening 14 in any desirable manner. As is clearly shown in Fig. 3, the walls 34' defining the cut-out portion closely embrace and are attached to a portion of the sides of the housing 12 and thus hold the slide 33 to the housing. A circular opening 35 is formed in the front of the slide 33, and is aligned with the opening 14 to permit the passage of light of unknown intensity therethrough from any source, onto the back of the prism 11. A transverse guide is formed by the slide 33 of a width which permits the free transverse movement of an optical measuring wedge 36 in front of the opening 14.

The slide 33 is formed with a recess 37 therein of a width substantially twice the thickness of the measuring wedge 36. Prior to the insertion of the measuring wedge through the slots in the end walls of the slide, a short compensating optical wedge 38 is inserted in the recess 37. The compensating wedge 38 is held against the back of the slide 33 in contact with the walls of the housing 12 surrounding the opening 14 as by a resilient spring 39 bearing against one end of the wedge and the end wall of the slide. The measuring wedge 36 is now inserted in the slots and in use is in sliding contact with the compensating wedge 38 (Figs. 1 and 3).

As is well-known in the art, an optical wedge consists of a member having a uniformly graduated density or opacity from one end to the other. The compensating wedge 38 is inserted in the slide 33 with the graduated density grading in an opposite direction to the measuring wedge 36. In this manner, the translucency through any portion of the juxtaposed wedges, is always constant for any setting of the wedge 36. The measuring wedge 36 may be divided into a scale comprising a plurality of uniformly spaced markings 39' for directly indicating the relative reduction in intensity of the fluorescent light (caused by the X-rays) on account of the optical wedge being in that particular position. The markings 39' may be numbered in any arbitrary manner, and the position of the wedge 36 can be noted by such markings against any stationary part of the apparatus, as for instance, one of the edges of the slide 33.

If desired a direct reading scale can be provided on the wedge whereby the need of using calibration curves or tables can be obviated.

Either formed integral with the front face of the slide 33 or secured thereto, is an internally threaded collar 40 extending out from the slide and surrounding the opening 35. A tube 41 threaded at one end, is attached to the collar 40 and is adapted to provide a pivotal support for a swiveled tube 42. As shown in Fig. 1, the inner end is in opposed abutting relation to the end of the collar 40, while the other end defines an opening the axis of which is at a 90° angle to the axis of the inner end. This is accomplished as by an elbow 43 formed integral with the tube 42 or secured thereto in any desired manner. The top of the elbow 43 is flat and is positioned at an angle of 45° to the axes of the end openings. A totally reflecting prism 44 is positioned in the elbow 43 with its long face in contact with the inner surface of the flat top of the elbow. A directive lens 45 is secured to one side of the prism 44 in any desirable way, as by cement.

A tube 46 made of thin micarta or other material that can pass X-rays, is secured to the elbow 43 in any desirable manner, with its axis coincident with the axis of the opening 43'. A fluorescent screen 47 is secured adjacent to the free end of the tube 46. This tube is rendered water tight as by a thin bakelite plate 48 closing by the free end thereof. Since the tube can pass the X-rays, any scattered rays from any direction which may pass obliquely to the screen 47 also assist in illuminating the screen, as the fluorescence is quite independent of the direction of the incident X-rays.

Due to the provision of the swivel joint formed by tubes 41, 42, the tube 46 can be adjusted in any angular position, to explore a region. Since tube 46 is water tight, the exploration can even be conducted below a liquid level, as in a water bath.

The operation of this device is now readily apparent from the foregoing. The combined structure consisting of the tubes 42 and 46 and the elbow 43 is turned until the fluorescent screen 47 is in the path of X-rays of unknown intensity issuing from any source. These X-rays illuminate screen 47, the light from which strikes the prism 44 and is directed thereby at an angle of 90° to their original direction through the directive lens 45. This lens directs the image through the juxtaposed wedges 36 and 38 and onto the prisms 10 and 11 and the back of the mirror 32. A common focal plane is formed at the center of this combined structure, including the prisms 10 and 11 and mirror 32.

An observer sighting through the eyepiece 21 will see a small disk surrounded by a brighter ring or annulus. This is due to the opacity of the mirror 32, and to the greater intensity of the fluorescent rays excited by the X-ray source, than that of those excited by the standard source. The observer, by then moving the measuring wedge 36 in the slide 33 until the intensity of the fluorescent rays caused by the X-ray source is diminished to the same intensity as those caused by the standard source; and then reading the scale thereon, will be able to determine the comparative intensity of the fluorescent rays caused by the X-ray source. This comparative intensity can be transferred into any desired units by means of calibration curves furnished with each instrument. For instance, r-units per sec. are used in clinical practice. Having obtained a balance by shifting the optical wedge one refers to the calibration curves which relate the scale reading on the optical wedge to the intensity of the X-ray beam in r-units per second for the particular set of filters and X-ray tube voltage in use on the X-radiation at that time. The observer can tell when the intensity of the fluorescent light from the X-ray source has been diminished to the same intensity as the rays from the standard source, by the elimination of the bright ring or annulus about the center spot. The observer now views a disk having a diameter equal to the outer diameter of the ring and having a uniform brightness throughout.

Since the source of radium radiations 28 is quite expensive, as small an amount as possible is used; and therefore the intensity of the illumination of the mirror is usually much less than the intensity of illumination of the field around the mirror from a screen 47.

Accordingly when wedge 36 is out, the center of the field of vision represented by mirror 32 is usually much darker than the surrounding annulus. In case the X-ray intensity is so great that the wedge will not cut down the fluorescence caused thereby sufficiently to effect a balance of the two fields of intensity, one simply moves the dosimeter farther away from the X-ray source and applies the inverse square law to get the intensity at the nearer point.

It is possible to utilize other means for cutting down the intensity of illumination of the screen 47; or for viewing the illumination caused by a standard source.

Thus in Fig. 4, the arrangement is such that a screen 49 excited by standard source 50 is viewed directly instead of by reflection. To this end, the casing 51 of the screen 49 and source 50 can be suspended as by fine wires or a transparent plate 52 inside of a tube 53 that forms an extension of eyepiece tube 18, and that can also conveniently serve to form a carrier for the wedges 36, 38.

In this instance the image of screen 47 is caused to occupy a plane 53' coincident with that of screen 49, whereby the relative intensities thereof can be compared as readily as in the first form, as the rays of light passing through wedges 36, 38 from screen 47 are unobstructed except for the area occupied by the screen 49.

In Fig. 5, an iris diaphragm arrangement 54 is provided in place of wedges 36, 38 to vary the degree of illumination reaching prisms 10 and 11 from screen 47. This iris can be of the usual aperture varying type, such as are in common use in optcal aparatus. The rotatable barrel of the mechanism can carry a scale 55 cooperating with a stationary pointer 56. There is provided an opalescent screen 57 upon which the light through iris mechanism 54 is focused, and the image of this screen in turn is focused as by lens 58 onto the focal plane at the center of the optical structure 10—11—32.

We claim:

1. An apparatus for determining the intensity of a source of X-ray emanations, comprising a source of illumination of standard intensity, a fluorescent screen forming a source of visible light rays when stimulated by the X-ray radiations, means for forming images on a common focal plane, of the source of standard intensity, and of the source of the visible rays caused by the X-rays, and means for varying the apparent intensity of the light caused by the X-rays on the common plane.

2. The combination set forth in claim 1 in which the means for forming images on a common focal plane comprises a structure including a pair of prisms and a reflecting spot of any shape between the prisms, the reflecting face of the spot being so placed that the intensity of one of the sources of illumination can be observed simultaneously with the intensity of the other source of illumination.

3. The combination set forth in claim 1 in which the means for varying the apparent intensity of the fluorescent rays excited by the X-rays on the common plane comprises a pair of juxtaposed relatively movable optical wedges, having the graduated opacity of one grading in an opposite direction to the graduated opacity of the other.

4. The combination set forth in claim 1, in which the means to form the images and to diminish the apparent intensity of the fluorescence caused by the X-ray beam being measured comprises a lens, an opalescent screen, and a diaphragm, said lens focusing the light from the fluorescent screen exposed to the X-ray beam on the opalescent screen which is then viewed comparatively with the illumination from some standard source.

5. An apparatus for determining the intensity of a source of X-ray emanations, comprising a means for forming a common focal plane, a source of fluorescent light of standard intensity focused on the common plane, a second source of fluorescent rays, means for picking up fluorescent rays from said second source stimulated by the X-ray emanations to be measured, and focusing the fluorescent rays on the common plane, means for viewing the effect of the ray intensities from both sources on the common plane, and means for varying the apparent intensity of fluorescence excited by the X-rays on the common plane.

6. An apparatus for determining the intensity of a source of X-ray emanations, comprising a pair of fluorescent screens made from similar material, a standard means for exciting one screen, a source of X-radiations for exciting the other screen, means for forming the images of the screens on a common plane, and means for varying the apparent intensity of fluorescence excited by the X-rays on the common plane.

7. Apparatus for determining the intensity of X-ray radiation, comprising a fluorescent screen adapted to be stimulated by the X-rays, means providing a standard intensity of illumination, and means for comparing the two sources of illumination, comprising a swivel support for the screen whereby its position in space can be adjusted.

JESSE W. M. Du MOND.
ARCHER HOYT.